United States Patent Office 3,402,916
Patented Sept. 24, 1968

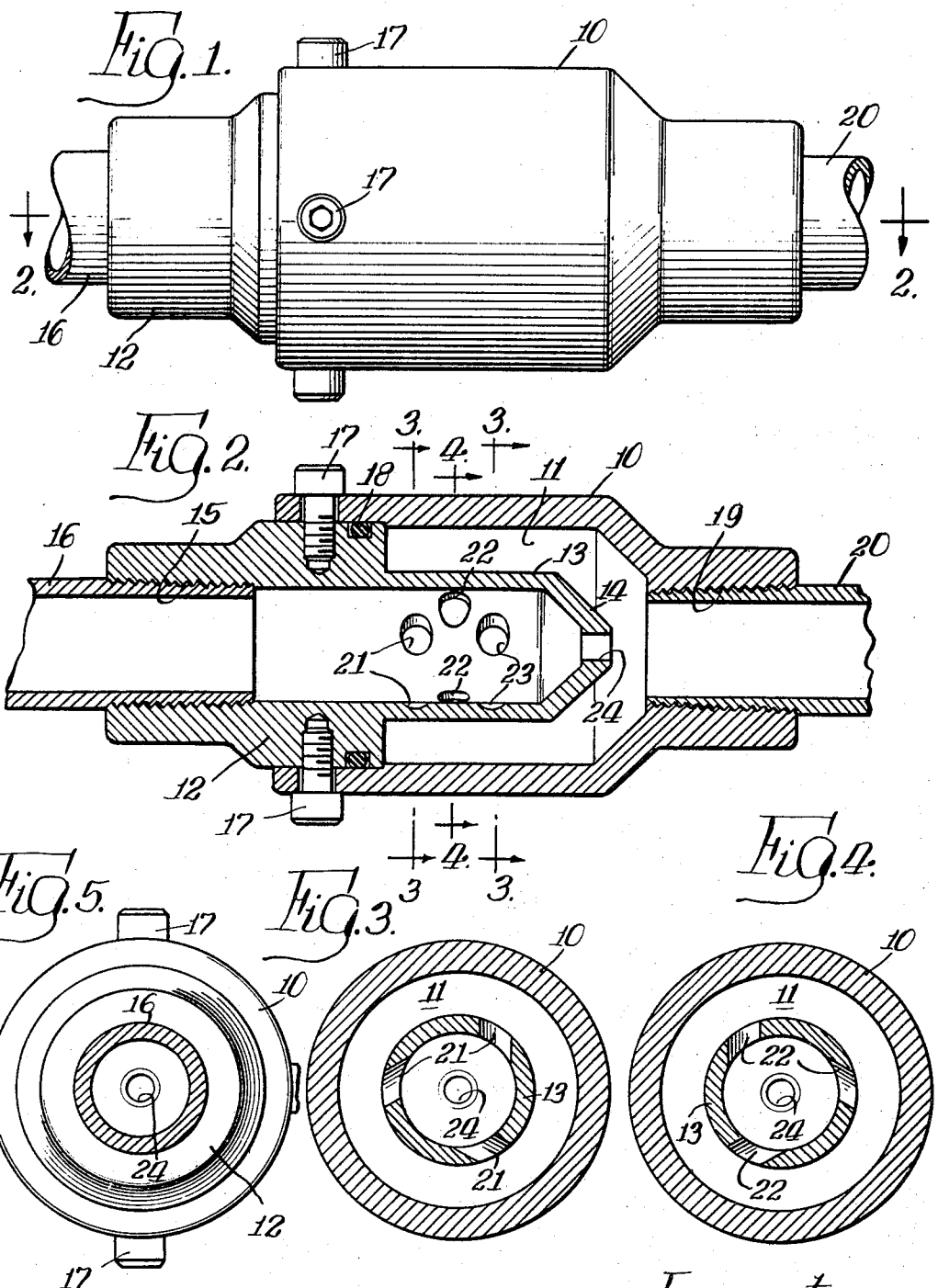

3,402,916
FLUID MIXING DEVICE
Willard A. Kates, Deerfield, Ill., assignor to The W. A.
Kates Company, a corporation of Illinois
Filed Dec. 2, 1965, Ser. No. 511,122
5 Claims. (Cl. 259—4)

ABSTRACT OF THE DISCLOSURE

The invention provides a fluid mixing device comprising a passage surrounded by a chamber. The passage is provided with a first and second plurality of ports which are inclined relative to the radius of the passage and which are oriented in opposite directions so as to provide intense turbulence at the shear planes thus created, thereby to mix the fluids thoroughly. The surrounding chamber is provided with an exit for the mixed fluids at one end and the passage may also be provided with an opening directed toward said end to aid in ejecting fluid from the chamber.

---

This invention relates to a fluid mixing device and more particularly to a fluid mixing device having no moving parts.

It is a general object of the present invention to produce a new and improved mixing device of the character described.

It is a more particular object of the invention to provide a device for accomplishing the intimate intermixture of fluids without the use of mechanical agitators such as propellers and the like.

Many industrial processes require the intimate intermixture of fluids, particularly liquids of different types, in order to accomplish desired functions. The commonly used mixers have comprised agitators or propeller-like devices of one form or another which are utilized to achieve the desired intermixture. Such devices are subject to well known limitations and, of course, comprise a number of moving parts with the resulting wear, malfunction, and general problems of upkeep.

In accordance with the present invention, however, there is produced a liquid or fluid mixing device which has no moving parts but which, through a specific arrangement of exit ports or openings and the creation of adjacent shear planes of rapidly moving fluids, produces a homogeneous intermixture. By the further utilization of the principles of an ejector, the mixing device of the present invention can be arranged so as to produce a minimum of back pressure and hence a minimum of pressure drop in a liquid line in which it may be used.

Other and further objects and advantages of the present invention will be readily apparent from the following description and the accompanying drawings, in which:

FIG. 1 is an elevational view of a fluid mixing device embodying the present invention;

FIG. 2 is a horizontal sectional view taken along line 2—2 of FIG. 1;

FIG. 3 is a vertical sectional view taken along line 3—3 of FIG. 2;

FIG. 4 is a vertical sectional view taken along line 4—4 of FIG. 2; and

FIG. 5 is an end view of the apparatus shown in FIG. 2.

While this invention is susceptible of embodiment in many different forms, there is shown in the drawings and will herein be described in detail a specific embodiment with the understanding that the present disclosure is to be considered as an exemplification of the principles of the invention and is not intended to limit the invention to the embodiment illustrated. The scope of the invention will be pointed out in the appended claims.

Referring now to the drawings, there is shown a generally cylindrical body 10 which is hollow to define a chamber 11 therewithin. Telescoped into the chamber 11 is a hollow fitting 12 terminating at one end in a tube 13 having a closed end 14. The fitting 12 is threaded at its other end 15 to receive a tube 16 for introducing fluids to be mixed to the interior of the fitting. The fitting is held in position within the chamber 11 by means of the screws 17 and in sealing relationship therewith through the medium of the O ring 18.

The end of the chamber 11 opposite the O ring is provided with an outlet 19 internally threaded so as to receive an outlet pipe or tube 20.

The tube 13 is provided with a first plurality of openings 21, each lying in a plane generally normal or perpendicular to the axis of the tube 13. Second groups of openings 22 and 23 are also provided in the tube 13 with the other groups of openings lying in planes parallel to but spaced from the plane of the openings 21. It will be noted from an examination of FIGS. 3 and 4 that the openings 21 of the first plurality are inclined somewhat to a radius of the tube while the openings of the next group are similarly inclined but in the opposite direction relative to the radius. At the closed end 14 of the tube 13 there is provided a discharge opening 24 adjacent but spaced from the outlet 19 of the chamber 11.

In operation, fluids to be thoroughly admixed are introduced through the tube 16 into the chamber formed in the interior of the tube 13. From this chamber the fluids are discharged at relatively high velocities through the openings 21, 22, 23, into the surrounding chamber 11. This discharge produces tangential shear in the liquid or fluid being mixed with the result that the various components become thoroughly intermixed. The discharge opening 24 in the end of the tube discharges fluid directly into the outlet 19 and thus acts as an ejector to assist in the withdrawal of the fluids from the chamber 11, hence minimizing the over-all pressure drop through the mixing device.

From the foregoing it can be seen that thorough intermixture of fluids, preferably liquids, is achieved by the device of the present invention in complete absence of moving mechanical parts and hence maintenance, wear, and upkeep are greatly minimized without attendant loss of efficiency. Additionally, the ejector effect of the discharge opening 24 reduces the pressure drop which would otherwise occur in the device, thus reducing the pumping requirements, etc., which might otherwise be necessitated.

I claim:

1. A fluid mixing device comprising, means forming a fluid passage having an axial extent, means defining a chamber surrounding said passage, a first plurality of openings in said passage, a second plurality of openings in said passage, said first and second plurality of openings lying in planes axially spaced from each other and all of said openings communicating with the chamber, with the first plurality of openings all being inclined in one direction relative to the radius of the chamber and with the second plurality of openings all being inclined in the opposite direction relative to the radius of the chamber, means for introducing fluids to be mixed into said passage, and an outlet from the chamber.

2. A fluid mixing device comprising, means forming a fluid passage having an axial extent, means defining a chamber surrounding said passage, a first opening in said passage, a second opening in said passage, said openings lying in planes axially spaced from each other and said openings communicating with the chamber, with the first opening being inclined in one direction relative to the radius of the chamber and with the second opening being inclined in the opposite direction relative to the radius of the chamber, means for introducing fluids to be mixed into said passage, means forming a discharge opening in one end of said passage, an outlet from the chamber adjacent but spaced from said discharge opening, said discharge opening directing a portion of the fluid introduced into said passage into said outlet to eject fluid in the chamber therethrough.

3. A fluid mixing device comprising a tube having an exit end provided with a discharge opening of a diameter substantially less than the diameter of said tube, means for introducing fluids to be mixed into said tube, means forming a fluid chamber surrounding at least a portion of the tube adjacent said exit end, an outlet from said chamber adjacent but spaced from said discharge opening in the exit end, a first plurality of openings in said tube each lying in a plane normal to the axis of the tube, a second plurality of openings in said tube each lying in a second plane parallel to but spaced from the first plane, said discharge opening in the closed end of the tube directing a portion of the fluid introduced into said tube into said outlet to eject fluid in the chamber therethrough.

4. A fluid mixing device comprising a tube having an exit end provided with a discharge opening of a diameter substantially less than the diameter of said tube, means for introducing fluids to be mixed into said tube, means forming a fluid chamber surrounding at least a portion of the tube adjacent said exit end, an outlet from said chamber adjacent but spaced from said discharge opening in the exit end, a first plurality of openings in said tube each lying in a plane normal to the axis of the tube, a second plurality of openings in said tube each lying in a second plane parallel to but spaced from the first plane with the first plurality of openings being inclined in one direction to the radius of the tube and with the second plurality of openings being inclined in the opposite direction to the radius of the tube, said discharge opening in the exit end of the tube directing a portion of the fluid introduced into said tube into said outlet to eject fluid in the chamber therethrough.

5. A fluid mixing device comprising a first tube having an exit end provided with a discharge opening of a diameter substantially less than the diameter of said first tube and an open entrance end adapted to receive fluids to be mixed, a second tube axially aligned with the first tube and having an open end adjacent the discharge opening in the first tube, means holding the tubes in fixed relationship with said holding means defining a chamber surrounding the first tube, a first plurality of openings in said first tube each lying in a plane normal to the axis of said tube, a second plurality of openings in said tube each lying in a second plane parallel to but spaced from the first plane with the first plurality of openings being inclined in one direction to the radius of said tube and with the second plurality of openings being inclined in the opposite direction to the radius of the tube, said discharge opening in the exit end of said first tube directing a portion of the fluid introduced into said first tube into said open end of the second tube to eject fluid in the chamber therethrough.

References Cited

UNITED STATES PATENTS

| 1,641,017 | 8/1927 | Staples | 239—472 |
| 3,047,275 | 7/1962 | Cox | 259—4 |

FOREIGN PATENTS

| 614,282 | 6/1935 | Germany. | |

WALTER A. SCHEEL, *Primary Examiner.*

J. M. BELL, *Assistant Examiner.*